United States Patent Office 2,888,342
Patented May 26, 1959

2,888,342
PROCESS OF MAKING A BONDED EXOTHERMIC COMPOSITION

Alan R. Fraser, Michigan City, Ind., assignor to Chromium Mining & Smelting Corporation, Limited, Chicago, Ill., a corporation of the Province of Ontario, Canada No Drawing. Application January 15, 1958
Serial No. 708,973

4 Claims. (Cl. 75—3)

This invention relates to bonded exothermic compositions and processes for preparing same. More particularly, the invention relates to a unitary, coherent block formed from an exothermic mixture of comminuted or pulverulent substances bonded together by a thermoplastic resinous material. The exothermic mixture includes a metallic constituent, a reducing material and an oxidizing agent. The reducing material and the oxidizing agent are present in sufficient amount with respect to the metallic constituent so that, upon ignition, the heat generated by reaction between the reducing material and the oxidizing agent is sufficient to fuse the composition and to render the metallic constituent readily soluble in molten metal such as a bath of steel or the like, to which the metallic constituent is to be added.

An object of the invention is to provide a unitary coherent block of exothermic material useful for the addition of metallic constituents to base metals for the production of alloys. Such materials are known and are employed for adding metals such as chromium, silicon, manganese, vanadium, titanium, tungsten, molybdenum, nickel, copper and the like, to ferrous metals for the formation of alloy steels and cast irons. For example, in making steel, a chromium-containing exothermic composition is placed in the bottom of a ladle and molten steel is tapped into the ladle from a furnace. The molten steel ignites the exothermic reaction mixture which burns and fuses the contained chromium which is dissolved in the molten steel with agitation caused by the exothermic reaction. High recoveries of chromium are thus achieved; recoveries of ninety-five percent or better are generally realized in open-hearth practice.

Another object of the invention is to provide a unitary coherent block of exothermic uniformly and intimately mixed reaction composition that is bonded by a thermoplastic resinous substance. It has been found that recovery of alloying materials is higher where the exothermic composition is agglomerated into blocks or briquettes having the reaction ingredients uniformly distributed in a resin matrix. Also, the keeping qualities of the compositions in storage is enhanced. Various methods of bonding have been proposed heretofore. Some of the prior methods have been open to certain objections such as fire hazards and tedious drying procedures. The materials of the prior art methods are often non-uniformly distributed with consequent loss of uniformity and efficiency of reaction. The process of the present invention eliminates many of the difficulties heretofore encountered in agglomerating exothermic mixtures and provides a block yielding excellent results in steel making procedures.

Still another object of the invention is to provide a process for forming blocks or briquettes of pulverulent exothermic reaction mixtures in a resin matrix protected against premature disintegration.

Typically, the process of the present invention includes mixing together solid pulverulent materials including a metallic constituent and a reducing material, a solid oxidizing agent capable of reacting upon ignition with the reducing material to release a substantial amount of heat, and a solid thermoplastic resinous material having a softening point below the fusion point of the oxidizing agent, forming the pulverulent mixture into the shape of a block in a metal container, heating the formed mixture at least as high as the softening point of the resinous material but below the fusion point of the oxidizing agent to melt the resinous material to a viscous fluid condition, and thereafter cooling the mixture to set the resinous material and to bond the mixture into a unitary coherent block having the pulverulent materials uniformly distributed throughout the solid resin matrix. The cooling procedure ordinarily involves mere cooling to room temperature by allowing the heated mixture to stand until cool.

The product of the foregoing process is a unitary coherent block in a metal container of uniformly distributed exothermic metallic reaction mixture including solid pulverulent materials as follows: A metallic constituent, a reducing material, and an oxidizing agent, the reducing material and the oxidizing agent being present in amounts that are sufficient upon ignition of the mixture to generate a substantial quantity of heat for fusing the mixture, the solid pulverulent materials being in intimate uniform admixture and being bonded together by a thermoplastic resinous material having a softening point below the fusion point of the oxidizing agent, the entire block being protected against premature disintegration by the metal container.

The thermoplastic resinous bonding substances employed in the present invention may be either synthetic or naturally occurring substances or derivatives thereof such as rosin, ester gums and the like. The thermoplastic resin melts in heating to a viscous fluid which retains the pulverulent materials in their original uniform mixed condition. This is unlike compounds hitherto used such as sodium nitrate which melts to a non-viscous watery mass and from which the ingredients tend to sink to the bottom and form a non-uniform mixture. Furthermore the melted resin on solidifying forms a hard matrix holding the pulverulent materials in place until the introduction of the molten metal to be alloyed, whereupon after a short period for melting the metal container, the resin volatilizes and disappears and the exothermic reaction takes place smoothly and efficiently.

Rosin, preferably wood rosin, is the preferred bonding material. Wood rosin has a softening point or melting point substantially lower than the fusion point of the commonly employed oxidizing agents such as sodium nitrate, sodium chlorate, sodium carbonate, sodium perchlorate, manganese dioxide and sodium or calcium chromate. The amount of rosin employed is not critical, but for reasons of economy it should be kept at a minimum. Also an excess of rosin or other thermoplastic resinous material may have a deterrent effect on the exothermic reaction. From about 0.5% to about 3.0% of rosin is a suitable proportion.

The reducing material of the mixture preferably is silicon, easily added in the form of ferrosilicon or ferrochrome silicon. The reducing material may also be carbon either added as such or as found in the ferrosilicon or other constituent of the mixture.

A preferred wood rosin is one sold under the trademark "Berez." It is a solvent extracted rosin obtained from pine stumps and has the following typical analysis:

| | |
|---|---|
| Color, grade | B |
| Melting point, drop | degrees F__ 190 |
| Melting point, ring and ball | degrees C__ 79 |
| Acid number | 100 |
| Petroleum naphtha insoluble | percent__ 65 |
| Unsaponifiable matter | do____ 20 |
| Saponification number | 140 |
| Toluene insoluble | percent__ 1.0 |
| Ash | do____ 0.1 |

Example I

An exemplary exothermic composition in accordance with the present invention that contains 6% reactive silicon consists of the following ingredients:

|  | Lbs. | Percent |
|---|---|---|
| Ferrochromium (Cr=51.84%, Si=4.70%) | 1,653 | 81.2 |
| Ferrosilicon (Si=50.0%) | 47 | 2.3 |
| Sodium nitrate | 306 | 15.0 |
| "Berez" wood rosin | 31 | 1.5 |
| Total | 2,037 | 100.0 |

The ferrochromium and ferrosilicon are separately ground in ball mills to provide fine powders having the following typical screen analyses:

| Mesh | +35 | +48 | +65 | +100 | +150 | +200 | −200 |
|---|---|---|---|---|---|---|---|
| Ferrochromium | 1.0 | 1.5 | 2.0 | 10.5 | 9.0 | 21.0 | 55.0 |
| Ferrosilicon | 1.5 | 1.0 | 2.0 | 12.5 | 12.5 | 20.0 | 49.5 |

The sodium nitrate is used in the form of fine crystals approximating in size the crystals of ordinary table salt.

The "Berez" wood rosin is ground in a pulverizing mill to provide a fine impalpable powder.

The materials in the foregoing amounts are blended and intimately mixed in a mix-muller and weighed into light gauge steel cans. The amount added to each can is sufficient to provide a predetermined quantity of contained chromium. Each can may contain, for example, 25 pounds of chromium and a total weight of from 56 to 57 pounds of the mixture. The cans are vibrated to settle the mixture therein and thereafter are passed to an oven and heated to a temperature of approximately 527° F. for a period of 70 minutes. This treatment melts the rosin without fusing the sodium nitrate. After being heated the cans are cooled to room temperature to set the rosin and to bond the mixture in the cans onto a unitary coherent block.

In the composition of this example, the ratio of sodium nitrate to reactive silicon is 3 to 1.

It is desirable to form the blocks of exothermic composition in cans as a protection against fire, weather and damage by handling. It is particularly advantageous to enclose the exothermic composition in a metallic container having a relatively high melting point such as a steel can. The composition is shipped and used in the containers. When molten metal is added to the ladle containing the cans of exothermic composition, it first must contact and melt the metal can. Thus the disintegration of the composition is slowed with consequent increase in efficiency of the reaction and heat production.

Example II

The following ingredients in powdered form are mixed in a mix-muller or pan mixer:

|  | Lbs. | Percent |
|---|---|---|
| Ferrochromesilicon (Cr=39.66%, Si=37.68%) | 926 | 46.7 |
| Ferrochromesilicon (Cr=46.97%, Si=24.47%) | 412 | 20.8 |
| Ferrochromium (Cr=52.74%, Si=5.31%) | 362 | 18.2 |
| Sodium nitrate | 255 | 12.8 |
| "Berez" wood rosin | 29 | 1.5 |
|  | 1,984 | 100.0 |

The blended material is weighed into cans to provide in each can 18 lbs. of available chromium and 9 lbs. of available silicon. The amount of sodium nitrate used is sufficient to oxidize silicon in the amount of 5% based on the metallics content of the composition.

The filled cans are vibrated, heated to 527° F. for 70 minutes and allowed to cool.

Example III

The following materials in finely comminuted form and in the amounts indicated are thoroughly blended in a mixing machine:

|  | Lbs. | Percent |
|---|---|---|
| Ferromanganese (Mn=78.95%, Si=1.36%) | 1,127 | 70.6 |
| Ferrosilicon (Si=72.34%) | 173 | 10.8 |
| Sodium Nitrate | 130 | 8.1 |
| "Berez" wood rosin | 21 | 1.3 |
| Fluorspar | 146 | 9.2 |
|  | 1,597 | 100.0 |

After blending, the material is packed in cans to provide in each can 35 lbs. of manganese and 3.5 lbs. of available silicon. Sufficient sodium nitrate is used to burn silicon in the amount of 4% based on the metallics content of the composition, the ratio of sodium nitrate to oxidizable silicon being 2.5 to 1 by weight.

The filled cans are vibrated, heated and allowed to cool as in the preceding examples.

Gum rosin, and thermoplastic synthetic resins having the required softening points may be substituted in equivalent amounts for wood rosin.

From the foregoing description it will be seen that the present invention provides a process for making blocks of exothermic composition that fully accomplishes the aims, objects and advantages of the invention.

This is a continuation in part of application filed July 9, 1952, Serial No. 298,012.

I claim:

1. The process of making an exothermic reaction block for use in adding an alloying metallic constituent to base metals, comprising: mixing in pulverulent form until intimately and uniformly blended an alloying metallic constituent, a reducing material, an oxidizing agent, and a thermoplastic resinous material having a softening point well below the ignition point of a mixture of said reducing material and said oxidizing agent; confining the resulting mixture in a metallic container; heating the mixture to a temperature above said softening point but well below said ignition point to convert said resinous material to a liquid sufficiently viscous that the remaining pulverulent ingredients will not stratify therein, said viscous liquid solidifying on cooling to firmly bond the mixture of alloying metallic constituent, reducing material and oxidizing agent, and maintain the uniformity thereof.

2. The process of claim 1 in which said metallic constituent comprises ferrochromium.

3. The process of claim 2 in which said reducing material comprises ferrosilicon and said oxidizing agent comprises sodium nitrate.

4. The process of claim 3 in which said thermoplastic resinous material comprises wood rosin.

References Cited in the file of this patent

UNITED STATES PATENTS

| 1,596,888 | Pacz | Aug. 24, 1926 |
| 1,975,084 | Davies | Oct. 2, 1934 |
| 2,138,286 | Wattson | Nov. 29, 1938 |
| 2,362,512 | Udy | Nov. 14, 1944 |
| 2,550,735 | Tour | May 1, 1951 |

FOREIGN PATENTS

| 1,125 | Great Britain | of 1875 |